United States Patent [19]

Hamada

[11] Patent Number: 5,014,806
[45] Date of Patent: May 14, 1991

[54] THROTTLE CONTROL APPARATUS

[75] Inventor: Tomohiro Hamada, Himeji, Japan

[73] Assignee: Mitsubishi Denki Kabushiki Kaisha, Tokyo, Japan

[21] Appl. No.: 176,748

[22] Filed: Apr. 1, 1988

[30] Foreign Application Priority Data

Apr. 6, 1987 [JP] Japan .................. 62-86235

[51] Int. Cl.$^5$ ............ F16K 31/00; B60K 31/00
[52] U.S. Cl. ................. 180/197; 123/342; 123/396; 123/399
[58] Field of Search .......... 180/197, 177; 123/342, 123/396, 399; 74/877

[56] References Cited

U.S. PATENT DOCUMENTS

| | | | |
|---|---|---|---|
| 3,627,074 | 12/1971 | Burckhardt | 180/197 |
| 3,982,509 | 9/1976 | Colling et al. | 180/197 X |
| 4,362,138 | 12/1982 | Krueger et al. | 123/342 |
| 4,392,502 | 7/1983 | Weston | 123/342 |
| 4,543,932 | 10/1985 | Sturdy | 123/342 |
| 4,747,461 | 5/1988 | Hayn et al. | 180/197 |

FOREIGN PATENT DOCUMENTS 2451286 11/1980 France .................. 123/342

Primary Examiner—Mitchell J. Hill
Attorney, Agent, or Firm—Oblon, Spivak, McClelland, Maier & Neustadt

[57] ABSTRACT

A throttle control device for a motor vehicle having a first movable member with first and second ends. A second movable member is connected to and surrounds the first movable member except for the first and second ends. During normal operation of the motor vehicle, when the accelerator pedal which is linked to the first end of the first movable member is engaged, results in the opening of the throttle valve. If the motor vehicle slips during accelerating or while engaged in a constant-speed cruise control mode, a driving motor rotates the second movable member which results in the closing of the throttle valve.

12 Claims, 3 Drawing Sheets

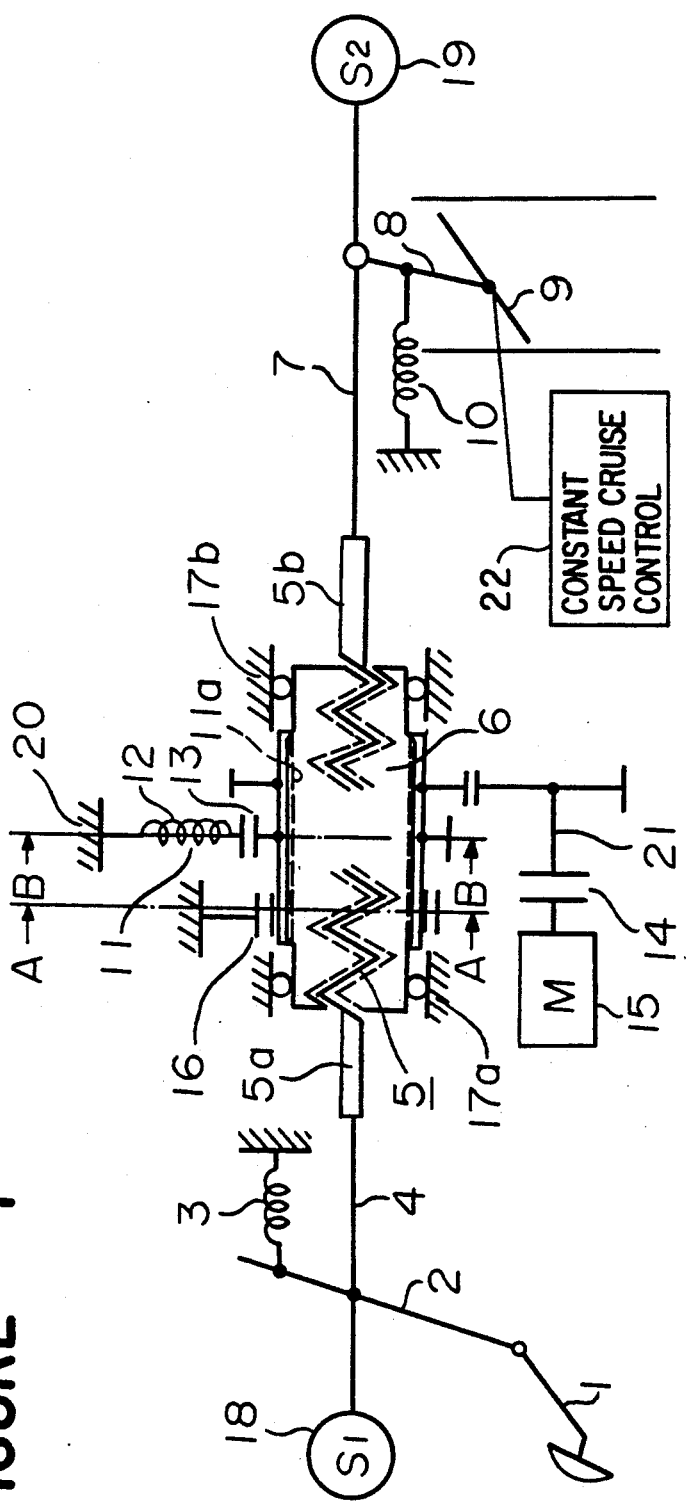
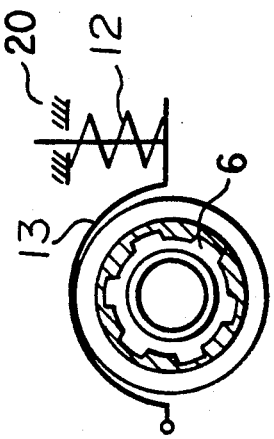
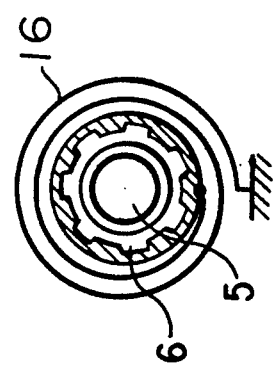
FIGURE 1
FIGURE 2
FIGURE 3

THROTTLE CONTROL APPARATUS

BACKGROUND OF THE INVENTION

1. Field of the Invention

The present invention relates to a throttle control apparatus for an automobile. More particularly, it relates to a throttle control apparatus including an accelerator operating system, a throttle valve operating system and a motor driving system capable of switching controlling operations between a constant-speed cruise control and a traction control.

2. Discussion of Background

Conventional automobiles typically have control means for the following functions:

1. When the driver operates the accelerator pedal to accelerate or decelerate the vehicle.
2. When the automobile slips or slides while the driver has implemented a constant-speed cruise device.
3. When the driver applies anti-skid brakes to slow down or stop the vehicle.

It has been common practice for the throttle valve and brakes of a vehicle to have separate control means. However, the performance of a motor vehicle will be improved if the throttle valve control means and break control means function in coordination with each other.

SUMMARY OF THE INVENTION

It is an object of the present invention to provide a structurally simple throttle control apparatus capable of changing control operations during a normal driving mode, during a traction control mode, and during a constant speed cruise control mode.

The foregoing and other objects of the present invention have been attained by providing a throttle control device for an automobile which comprises a first movable member whose function is dependent upon the extent to which an accelerator pedal is pressed to the floor of the vehicle; a throttle link controls the degree to which a throttle valve is opened by means of a throttle wire connected to the first movable member.

Should the motor vehicle, while operating in a traction control mode slip or slide on the surface over which it is travelling, a control means is engaged which rotates the second movable member such that the throttle valve is properly regulated. Should the vehicle slip or slide while operating in a constant-speed cruise control mode, the movement of a throttle wire is controlled in proportion to the deviation in vehicle speed by the stroke control of the throttle wire.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagram showing an embodiment of the throttle control apparatus according to the present invention;

FIG. 2 is a cross-section view of the throttle control apparatus taken along a line A—A in FIG. 1; and FIG. 3 is a cross-sectional view of the throttle control apparatus taken along a line B—B in FIG. 1

DETAILED DESCRIPTION OF THE PREFERRED EMBODIMENTS

Figure 4:
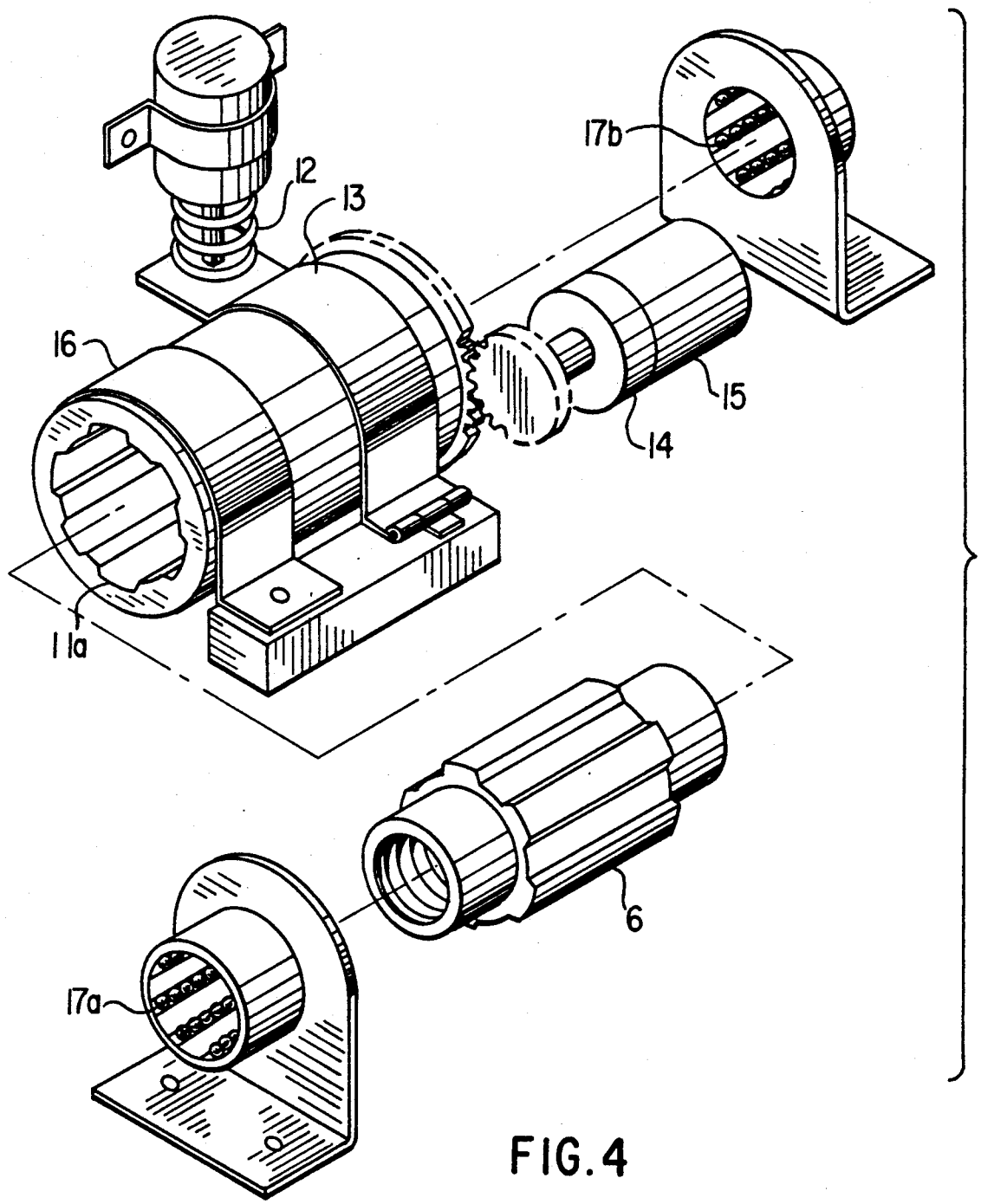
FIG. 4 is a perspective view depicting the arrangement of the spline and second movable member of the present invention.

Referring now to the drawings, wherein the same reference numerals designate the same or corresponding parts in FIG. 1, there is shown a diagram of a typical example of the throttle control apparatus of the present invention.

Reference numeral 1 designates an accelerator pedal. An end of the accelerator link 2 is connected to the pedal 1. An accelerator link spring 3 is connected between the other end of the accelerator link 2 and a fixed end of an automobile so that the accelerator link 2 can be returned to its original position.

Figure 5:
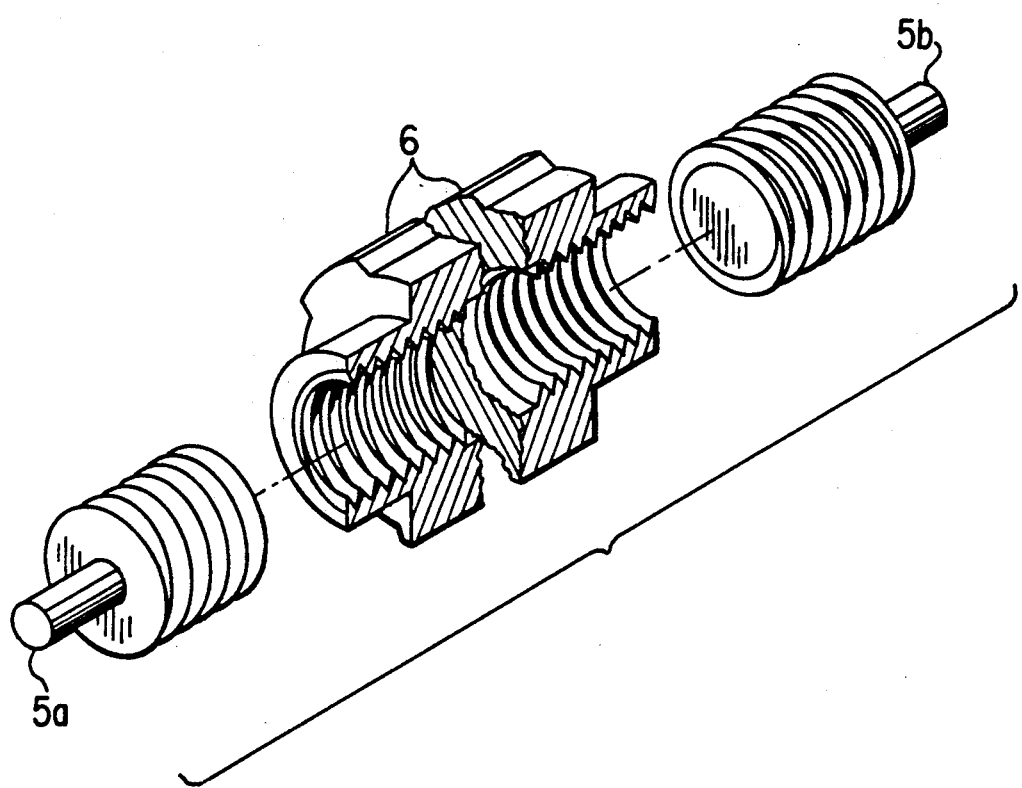
FIG. 5 is a cutaway view of the second movable member depicting how the male screws of the first movable member are connected thereto.

An accelerator opening degree detector 18 is attached to the accelerator link 2 to detect the degree of opening of an accelerator. An end of the accelerator wire 4 is connected to the intermediate portion of the accelerator link 2 and the other end of accelerator wire 4 is connected to an end 5a of a first movable member 5. A male screw is formed in the outer circumferential surface of the end 5a of the first movable member. The male screw is engaged with a female screw formed in the inner circumferential surface of a second movable member 6 having a hollow body. The female screw of the second movable member is also engaged with a male screw formed in the other end 5b of the first movable member 5. The male screws formed in both ends 5a, 5b are threaded in different directions. See FIG. 5. A throttle link 8 is connected to the other end 5b of the first movable member 5 through a throttle wire 7.

The degree of opening of a throttle valve 9 in the air intake tube of the engine is controlled by the throttle link 8. A throttle link returning spring 10 is connected between the throttle link 8 and a fixed end of the automobile so that the throttle valve 9 is normally kept at the valve closing position. A constant speed cruise control 22 is also connected to the throttle valve in a manner well known in the art.

A throttle valve opening degree detector 19 is attached at an end of the throttle link 8 to detect the degree of opening of the throttle valve 9.

A returning spring 16 is interposed between the outer circumferential surface of the second movable member 6 and a fixed end of the automobile. The returning spring 16 is a spiral form and one end of it is fixed to the outer circumferential surface of the second movable member and the other end is fixed to the automobile after it is wound around the second movable member several times (FIG. 2), whereby the second movable member 6 is urged to the original position.

Between both ends of the second movable member 6 and the fixed ends of the automobile, there are respectively interposed slide bearings 17a, 17b so that the second movable member 6 is supported by the slide bearings 17a, 17b in a slidable manner. See FIG. 4.

A locking unit 11 is arranged on the outer circumferential surface of the second movable member 6. The locking unit 11 is adapted to hold and lock the second movable member 6 by means of a coupling plate 13. The locking unit 11 is provided with a spline portion 11a so as to allow the second movable member 6 to slide in its axial direction. A compression spring 12 is connected between the coupling plate 13 and a fixed end 20 of the automobile as shown in FIG. 3. By the compression spring 12, the coupling plate 13 is urged toward the second movable member 6 so as to fixedly hold the second movable member 6. The coupling plate 13 controls the connection and disconnection.

A driving motor 15 is connected to the locking unit 11 through a clutch 14 and a driving shaft 21.

The operation of the throttle control apparatus of the present invention will be described.

(1) Initial stage

At the initial stage, i.e., a power source being off, the accelerator link 2 and the throttle link 8 are respectively positioned at their original positions by the action of the accelerator link spring 3 and the throttle link returning spring 10 respectively.

(2) Normal driving control

During normal driving conditions, i.e., when the accelerator pedal is operated, the accelerator wire 4 connected to the accelerator 2 is moved to the left (see FIG. 1) and the first movable member 5 is also driven to the left together with second movable member 6. See FIGS. 5 and 6. This results in the throttle wire 7, which is connected to the first movable member 5, also being moved to the left, whereby the degree of opening of the throttle valve 9 is controlled in proportion to the stroke movement of the throttle wire 7. Thus, car sped is controlled by and corresponds to the degree of opening of the throttle valve 9.

The motor 15, the clutch 14 and the coupling plate 13 are all in off condition, and the second movable member 6 is in a locking state by the locking unit 11. Further, there is no control by an outer driving motor.

(3) Traction control

When an automobile is operating in a normal driving mode and slips upon the road surface while accelerating, a slip detecting device (not shown) provided in a brake control unit is actuated and generates a detection signal which actuates the motor 15, the clutch 14 and the coupling plate 13. As a result, the second movable member 6 is released from the locking unit 11 and a torque from the motor 15 acts on the second movable member 6 to rotate it. Accordingly, the first movable member 5 is moved in the direction to close the throttle valve 9 and the following sequential steps take place.

(I) The degree of opening of the throttle valve is further closed with respect to its original position.

(II) When the slip detection signal is stopped, the direction of rotation of the motor 15 is reversed and the throttle valve is opened to its original position.

(III) When the throttle valve is returned to its original position, the motor 15 is turned off and the clutch 14 and coupling plate 13 are returned to their previous positions.

Thus, normal driving operation begins anew.

The output $S_2$ of the throttle valve opening degree detector 19 is as follows:

At the time of starting the traction control $$S_2 = S_0 \tag{1}$$

During the traction control $$S_{2a} = S_0 - \Delta S \tag{2}$$

At the time finishing the reaction control $$S_{2b} = S0 \tag{3}$$

where $S_0$ is the initial degree of opening of the throttle valve and $\Delta S$ is the variation in the degree of opening during the traction controlled operation of the vehicle.

(4) Constant-speed cruise control

If the vehicle experiences slipping while operating in a constant-speed cruise control mode, control by the motor 15 is performed in the same manner as in traction control. Namely, the second movable member 6 is released from the locking unit 11 and the stroke movement of the throttle wire 7 is controlled in proportion to the variation in car speed, whereby the degree of opening of the throttle valve is controlled. When the slip detection signal stops, the throttle valve returns to its original position and the constant-speed cruising operation is re-set.

The output $S_2$ of the throttle opening degree detector 19 is shown as follows:

At the time of starting the constant speed cruising $$S_2 = S_0 \tag{4}$$

During the constant speed cruising $$S_{2a} = S_0 \pm \Delta S \tag{5}$$

At the time of finishing the constant speed cruising $$S_{2b} = S0 \tag{6}$$

where $S_0$ is a target degree of opening and $\Delta S$ is the variation in the degree of opening under the controlled operation of the vehicle.

Thus, the throttle control apparatus of the present invention is such that for normal driving control, the degree of opening of the throttle valve is controlled by the throttle link through the first movable member and the throttle wire depending on the extent to which the acceleration pedal is pushed to the floor; in traction control, when a vehicle's slipping is detected, the degree of opening of the throttle valve is reduced by the turning movement of the second movable member by means of the rotating force of the motor and the clutch; and in the constant speed cruise control, the degree of opening of the throttle valve is controlled by the stroke movement of the throttle wire in proportion to the variation in car speed. Accordingly, it is possible to perform sequential control during normal driving, during traction control and during constant speed control operations of a motor vehicle. Further, the mechanism for such control operations is remarkably simple and provides a great advantage in practical use.

Obviously, numerous modifications and variations of the present invention are possible in light of the above teachings. It is therefore to be understood that within the scope of the appended claims, the invention may be practiced otherwise than as specifically described herein.

What is claimed is:

1. A throttle control device for a motor vehicle, said motor vehicle having an accelerator pedal and a throttle valve, said throttle control device comprising:

a first movable means formed of a first part and second part which are separated, said first part having an end which is a first end of said first movable means and said second part having an end which is a second end of said first movable means;

a second movable means being circumferentially connected to and partially receiving said first and second parts of said first movable means so that said first end and said second end of said first movable means extend beyond said second movable means;

driving means for driving said second movable means, said driving means connected to such second movable means;

linking means for linking said accelerator pedal to said first end of said movable means;

connecting means for connecting said second end of said first movable means to said throttle valve.

2. A device according to claim 1, further comprising:

locking means for locking said second movable means so as to prevent rotation of said second movable member, said locking means being disconnected from said second movable means when said driving means is actuated.

3. A device according to claim 2, wherein said locking means comprises:

a compression spring; and a coupling plate in pressure contact between said compression spring and said second movable means.

4. A device according to claim 3, wherein said driving means comprises:

a driving motor;

a clutch connected to and engaged by said driving motor; and a drive shaft connected to the clutch.

5. A device according to claim 4, wherein:

said drive shaft is connected to said locking means.

6. A device according to claim 3, wherein said locking means further comprises:

a spline portion connected to said second movable means so as to allow said second movable means to slide in an axial direction.

7. A device according to claim 1, wherein said connecting means comprises:

a throttle wire; and a throttle link connected to said throttle wire and to said throttle valve.

8. A device according to claim 7, further comprising:

a throttle valve opening degree detector connected to said throttle link.

9. A device according to claim 1, wherein:

said driving means is actuated to rotate said second movable means when said motor vehicle loses traction and slides while accelerating.

10. A device according to claim 1, wherein:

said driving means is actuated to rotate said second movable means when said motor vehicle slides while being operated in a constant-speed cruise control mode.

11. A device according to claim 1, further comprising:

an accelerator opening degree detector connected to said linking means.

12. A device according to claim 1, further comprising:

a plurality of slide bearings mounted on said motor vehicle and supporting said second movable means.

* * * * *